United States Patent [19]
Ellis et al.

[11] 3,895,832
[45] July 22, 1975

[54] COLLET COMPRESSION CONNECTION

[75] Inventors: Daniel A. Ellis; Lawrence F. Luckenbill, both of Decatur, Ill.

[73] Assignee: Mueller Co., Decatur, Ill.

[22] Filed: May 13, 1974

[21] Appl. No.: 469,495

[52] U.S. Cl. ............ 285/322; 285/334.4; 285/343; 285/382.2
[51] Int. Cl.$^2$ ......................................... F16L 21/06
[58] Field of Search ........ 285/343, 322, 323, 382.7, 285/382.2, 334.4, 257

[56] References Cited
UNITED STATES PATENTS

| | | | |
|---|---|---|---|
| 2,383,692 | 8/1945 | Smith | 285/322 |
| 2,412,664 | 12/1946 | Wolfram et al. | 285/343 |
| 2,453,024 | 11/1948 | Lomelino | 285/343 |
| 2,540,368 | 2/1951 | Harding | 285/343 |
| 2,695,796 | 11/1954 | Woodling | 285/382.7 X |
| 3,079,182 | 2/1963 | Appleton | 285/343 |
| 3,139,293 | 6/1964 | Franck | 285/382.7 X |
| 3,425,452 | 2/1969 | Shaw | 285/343 X |
| 3,754,781 | 8/1973 | Conroy | 285/343 X |

FOREIGN PATENTS OR APPLICATIONS

| | | | |
|---|---|---|---|
| 456,268 | 7/1968 | Switzerland | 285/343 |

Primary Examiner—Thomas F. Callaghan
Attorney, Agent, or Firm—Cushman, Darby & Cushman

[57] ABSTRACT

A collet-type joint for coupling or connecting an end portion of a flareless or smooth wall pipe to fittings or other pipes, the joint including two relatively movable members, one of the members being a body member having a passageway therethrough with an annular shoulder in the passageway to limit initial movement of the pipe into th passageway, the body member further having an annular groove in the passageway for receiving a deformable sealing ring or gasket and a collet nose outwardly of the groove which is provided with longitudinally extending slots defining arcuate fingers having an interior annular gripping tooth on the same, whereas the other of the members being a follower or compression member for constricting the arcuate fingers of the collet nose to grip the pipe and also simultaneously causes the collet nose to mechanically apply a load to the sealing ring. Further, the joint contemplates providing the annular shoulder with a taper whereby when the joint is made up, the pipe may be moved longitudinally inwardly with its end being tapered or swaged by the shoulder, thereby eliminating damage to the exterior surface of the pipe by the gripping means and reducing torque on joint make up.

12 Claims, 8 Drawing Figures

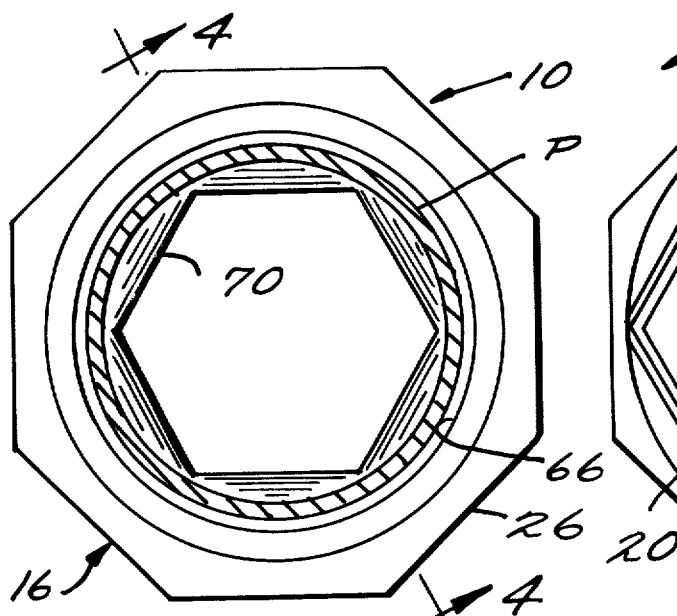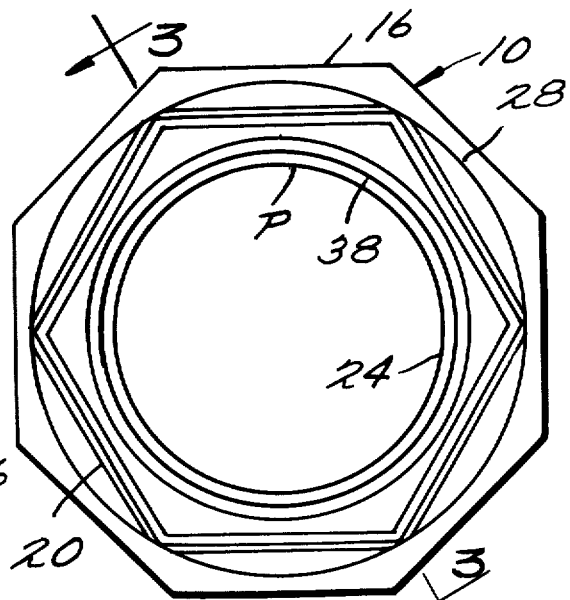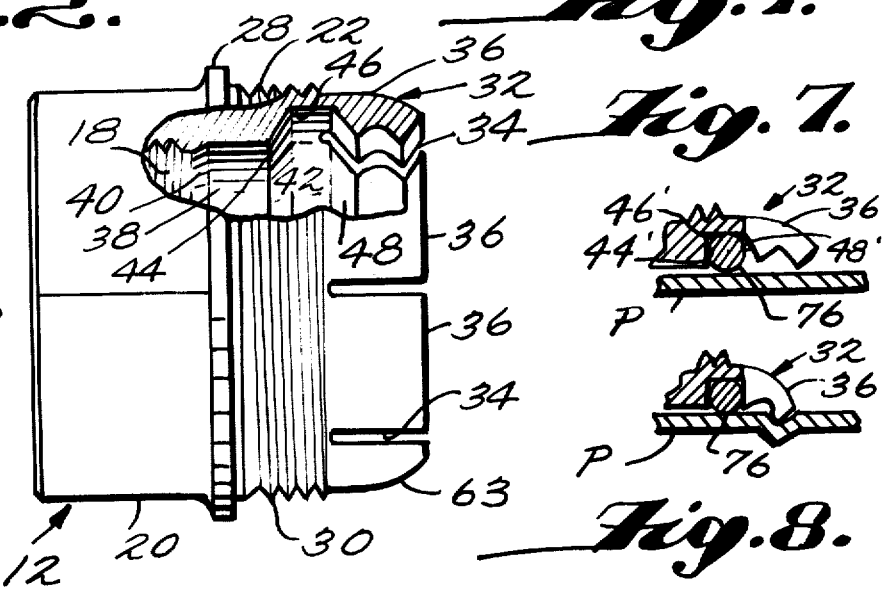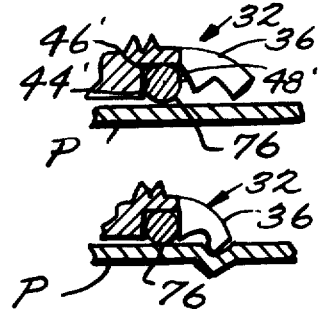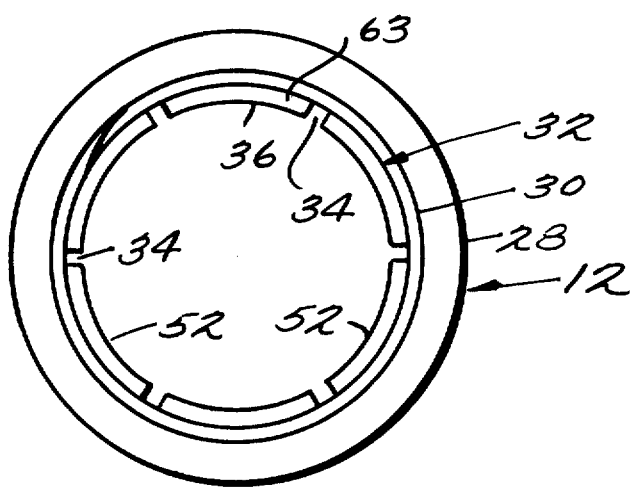

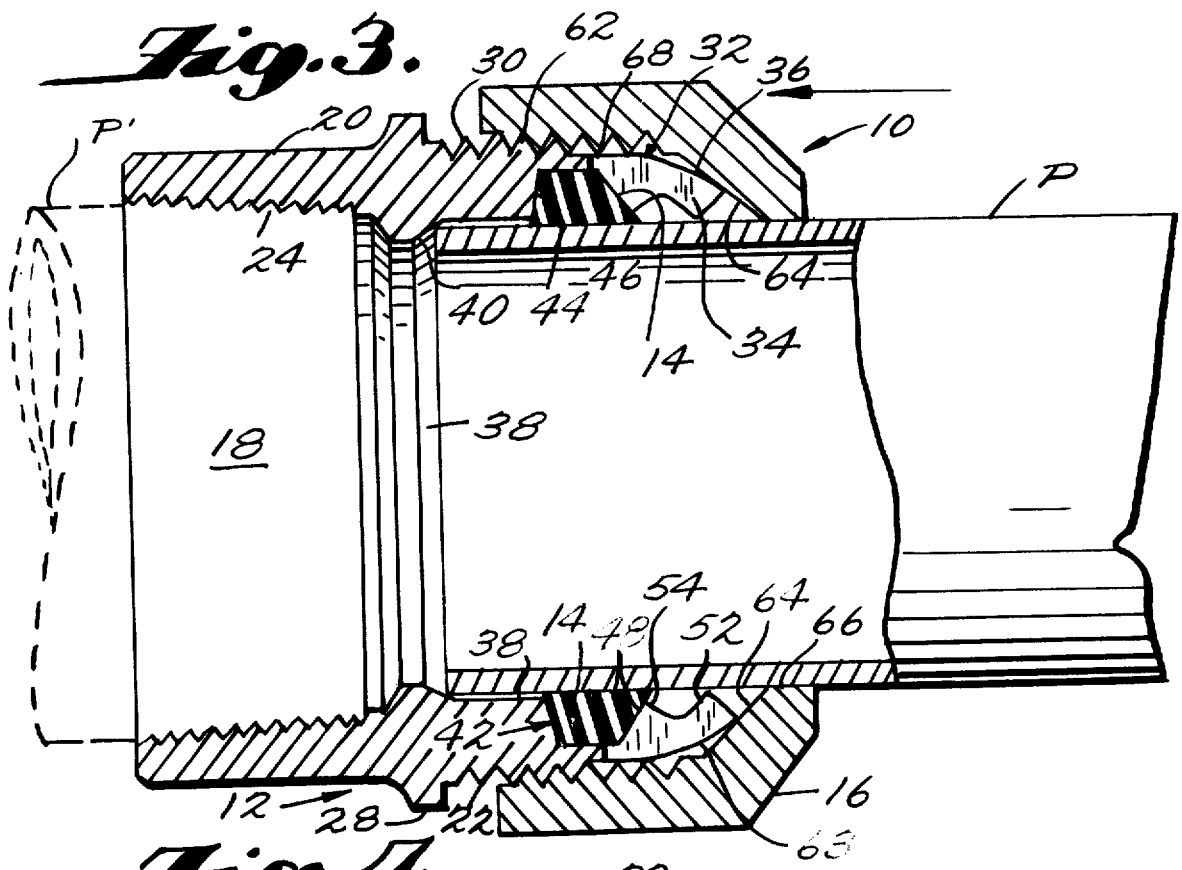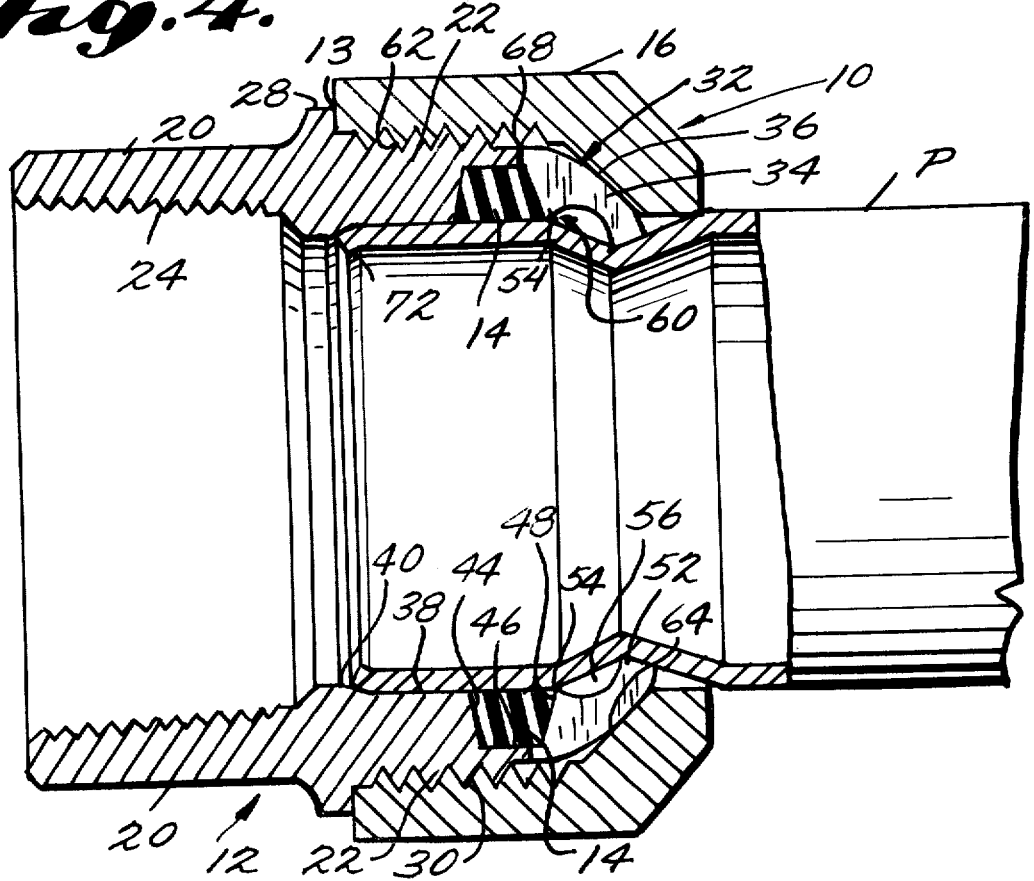

COLLET COMPRESSION CONNECTION

The present invention relates to an improvement in joints for flareless or smooth wall pipes, the joint being such that when it is made up, it has high resistance to pull out, as well as a high degree of resistance to leakage throughout a range of pressures and temperatures to which the joint is subjected when used with fluid distributions systems such as water, gas, or chemical distribution systems. In more detail, the joint of the present invention is a collet-type of joint in which the arcuate fingers or segments of the collet nose are actuated to grip the pipe simultaneously with the mechanical application of a load on a deformable sealing ring or gasket.

BACKGROUND OF THE INVENTION

Heretofore, collet-type joints have been used primarily in joining sections of conduits for electrical conductors wherein the conductors extend through the conduits. In this type of joint wherein conduits for electrical conductors were connected, it was highly desirable to make the joint moisture proof, but this did not present too much of a problem as the interior of the joint was never subjected to extreme pressures such as those found in fluid distribution systems for gas, water, and chemicals or the like. Some efforts have also been made in the past to incorporate a collet-type of joint for pipes of fluid distribution systems. In this latter situation, sealing means were provided which has to be separately loaded if it was of the type wherein the sealing ring or gasket was mechanically loaded or the joint merely provided for an O-ring type of seal separate from the collet portion of the joint with the O-ring seal being such that it was loaded in the normal manner upon insertion of the pipe into the body member of the fitting. The aforementioned collet-type joints have not been entirely satisfactory in fluid distribution systems in that the sealing ring or gasket was subjected to cold flow if it was of the O-ring type and if it was the type where separate provisions had to be made to load the same, the joint proved extremely costly.

Additionally, the prior art collet-type joint wherein the fingers of the collet were provided with teeth to grip the pipe, had the disadvantage in that the pipe could not move slightly in a longitudinal direction during joint make up, and, consequently, the teeth of the collet fingers would score or damage the exterior surface of the pipe and the joint would require higher make up torques. This proved unsatisfactory, especially when the pipe was a thin wall pipe or a plastic pipe and was subjected to high internal fluid pressures.

PRIOR ART

Some typical prior art relating to joints or couplings for flareless or smooth end pipes are as follows:

| | | |
|---|---|---|
| 1,257,852 | Hall | February 26, 1918 |
| 2,383,692 | Smith | August 28, 1945 |
| 2,420,617 | Paquin | May 13, 1947 |
| 3,079,182 | Appleton | February 26, 1963 |
| 3,232,648 | Franck | February 1, 1966 |
| 3,498,647 | Schroder | March 3, 1970 |

BRIEF SUMMARY OF THE INVENTION

The present invention relates to an improved collet-type joint for connecting an end portion of a flareless or smooth wall pipe to fittings or other pipes, the joint utilizing a hollow body member having a passageway therethrough, the body member having an axially extending portion through which a portion of the passageway extends with means in this portion of the passageway for limiting inward movement of the pipe. Additionally, the hollow body member is provided with an annular groove for receiving a deformable sealing ring with means to mechanically load the sealing ring and a collet nose having longitudinal extending slots defining arcuate fingers with at least one interior gripping tooth in the collet nose on the fingers for gripping the pipe. Further, the joint includes follower means for simultaneously constricting the fingers of said collet nose to grip the pipe and actuating the means to mechanically load the deformable sealing ring.

In slightly more detail, the means in said body member for mechanically loading the sealing ring includes a second interior tooth in said collet nose on its arcuate fingers positioned or spaced longitudinally inwardly of said first tooth and having an inwardly facing wall or surface which defines at least a portion of the annular groove for the deformable sealing ring and which presses against the sealing ring when the collet nose is constricted. The second tooth, when the joint has been made up, prevents the sealing ring from extruding into the area between the first tooth and the second tooth and the pipe where the pipe has been deformed by the first tooth, thereby eliminating the possibility of the same affecting pull out strength. The first tooth irregularly deforms the pipe so that it can have no rotational movement relative to the body member, as well as no longitudinal or axial movement.

The present invention also relates to any type of joint for connecting a flareless or smooth wall pipe to a fitting or other pipe wherein the joint, upon make up, has a tendency to move the pipe longitudinally into the body member. To accomplish this, an annular shoulder is provided in the passageway of the body member, which is at a slight angle to the axis of the passageway, the slight or shallow taper provided by such angle permitting the pipe to be initially accurately positioned in the body member prior to make up of the joint and then the joint to be made up with less torque on the various members thereof while permitting the pipe to be moved slightly longitudinally with its end being swaged or tapered slightly inwardly. This also eliminates any scarring or grooving of the exterior surface of the pipe in a longitudinal direction by the means for gripping the pipe and, thus, the wall strength of the pipe is not weakened in a localized area whereby high internal fluid pressures could cause failure.

The present invention provides an improved collet-type joint which can be used with copper, plastic, or steel pipe. It is inexpensive to manufacture, and may be easily and quickly made up in the field for use in fluid lines for distributions of fluid such as gas, water, and certain flowable chemical products. The make up of the joint does not require any special skills or technical knowledge of field workmen. Further, the members of the joint can be made, except for the deformable sealing ring, of brass, plastic, steel, or any other ductile material, or any combination of the same, so long as the material is compatible with the material of the pipe being used. In other words, the joint should be made of a material having higher strength characteristics than the pipe being used because the teeth of the collet nose of the joint must be able to deform the pipe. The joint is compatible for large tolerances in the outside diameter of the same diameter pipe as the sealing ring is positively loaded and the arcuate fingers of the collet nose have sufficient movement to accommodate large tolerances.

DESCRIPTION OF THE DRAWINGS

FIG. 1 is an end elevational view of the joint looking generally from the left of FIG. 3 with the body member not attached to a fitting or another pipe and with the joint not made up.

FIG. 2 is an end elevational view of the joint looking from the right of FIG. 4 with the joint actually being made up and with the pipe shown in section.

FIG. 3 is a cross-sectional view, partly in elevation, and taken substantially on the section line 3—3 of FIG. 1, the view illustrating the various members of the joint prior to actual make up.

FIG. 4 is a view similar to FIG. 3 and taken on the section line 4—4 of FIG. 2, the view showing the joint when fully made up.

FIG. 5 is a side elevational view, partly broken away, and illustrating the body member of the joint of the present invention.

FIG. 6 is an end elevational view looking from the right of FIG. 5 and illustrating the body member.

FIG. 7 is a fragmentary view, partly in section and partly in elevation, illustrating a modified form of the body member wherein an O-ring is used.

FIG. 8 is a fragmentary view similar to FIG. 7 and illustrating the loading of the O-ring and the gripping of the pipe by the collet nose of the body member.

DETAILED DESCRIPTION OF THE INVENTION

Referring now to the drawings wherein like characters or reference numerals represent like or similar parts, there is disclosed in FIGS. 1 to 4, inclusive, a collet-type joint of the present invention generally designated at 10. The joint is used for attaching smooth wall or flareless pipe P to a fitting or another pipe, for example, the pipe P' shown in broken lines in FIG. 3.

Broadly, the joint 10 includes a hollow body member, generally designated at 12, a deformable sealing ring or gasket 14, and follower means such as the ring-type compression nut 16. For the purpose of this description, the member 12 is referred to as a "body member," it being understood that this term, as used in the specification and claims, is intended to cover a fitting per se, a fitting forming part of a valve body or a valve stop, a fitting for connecting another pipe directly thereto, a service tee fitting, a tapping fitting, an elbow fitting, a fitting for a tank, or the like. The hollow body member 12, as shown in the drawings, includes a passageway 18 extending completely therethrough, the passageway extending through one end portion 20 to and axially through the other end portion 22 with the other end portion 22 being axially extending relative to the pipe P which it receives. The end portion 20, as shown in the drawings, may be provided with interior threads 24 for receiving the pipe P' or another fitting, and it may have an exterior configuration which is hexagonal, as shown at 26, or some other suitable non-circular shape for receiving a tool such as a wrench or the like. Intermediate the end portion 20 and the other end portion 22, there is provided a shoulder 28 which functions as a stop for the compression nut 16 to bottom on when the joint 10 is fully made up, as shown in FIG. 4.

The other end portion 22 is exteriorly threaded at 30 for a portion of its length and outwardly of the threads 30 there is provided a collet nose 32, which has longitudinally extending slots 34 therein defining arcuate collet fingers 36. The body member 12, shown in the drawings and particularly FIG. 6, is provided with six slots 34, thus defining six arcuate fingers 36, but it is, of course, within the scope of the invention to provide any number of plurality of slots in the collet nose, the number being dependent on the material and size of the body member and the material and size of the pipe P. The other or axially extending end portion 22 has a portion 38 of passageway 18 extending therethrough, the portion 38 terminating at its inner end in an inwardly and rearwardly tapered shoulder 40, the purpose of which will be described later in the specification.

Spaced outwardly of the shoulder 40 in the portion 38 of the passageway 18 is an annular groove, generally designated at 42, the annular groove 42 being defined by an outwardly facing wall 44, a bottom wall 46, and an inwardly facing wall 48. It will be noted that the radial cross-sectional configuration of the groove 42 is trapezoidal in shape with the outwardly facing wall 44 extending at a lesser angle to the axis of the portion 38 of passageway 18 than the rearwardly facing wall 48 in FIG. 3 prior to constriction of the collet nose 32, whereas in FIG. 4, after the collet nose has been constricted, the wall 48 is substantially at the same angle as the wall 44 so that the radial cross-sectional configuration of the groove 42 becomes that of a substantially regular trapezoid. The groove 42 is arranged to receive the annular deformable sealing ring 14 which, in its relaxed condition, has a radial cross-section which is trapezoidal in shape and substantially complementary to the groove 42 prior to constriction of the collet nose 32. A more detailed description of the loading of the deformable sealing ring or gasket 14 will follow later in the specification.

The collet nose 32 has at its outer most end a sharp interiorly extending annular tooth 52 which is defined as an arcuate segment on each of the arcuate fingers 36 making up the collet nose. The crest diameter of the tooth 52 is at least as great as the outside diameter of the pipe P prior to the collet nose 32 being constricted and, thus, the pipe can have its end freely pass through the collet nose. The tooth 52 is a gripping tooth which is adapted to deform the pipe P, as shown in FIG. 4, when the collet nose 32 is constricted.

A second annular tooth 54 is provided on the collet nose 32, the tooth 54 being defined as arcuate segments on the fingers 36 and the inner ends of the slots 34. Since the tooth 54 is spaced longitudinally inwardly from the gripping tooth 52, there is an annular space 56 defined therebetween. The tooth 54 has a crest diameter slightly greater than the crest diameter of the gripping tooth 52 prior to constriction of the collet nose 32 and it will be noted that the rear surface of the tooth 54 defines the rearwardly facing wall 48 of the groove 42. As shown in FIG. 4, after the collet nose 32 and its fingers 36 have been constricted, the tooth 54, which is on and moves with the fingers 36, has pivoted inwardly to a position where it just contacts the exterior wall of the pipe P and its wall 48 has applied a load to the sealing ring 14. Since the tooth 54 just contacts the exterior wall of the pipe P in the constricted position, it will prevent further cold flow of the sealing ring 14 into the space 56 between the teeth 52 and 54. If any of the sealing ring 14 extrudes into the space 56 during constriction of the collet nose 32, as indicated at 60 (FIG. 4), it will be clipped off because the tooth 54 will eventually touch the surface of the pipe P and prevent further flow into the space 56 which could affect the gripping power against pull out of the tooth 52 upon makeup or upon subsequent removal of the follower means or nut 16. The exterior surface 63 of the collet nose 32 converges or tapers inwardly and is substantially frusto-spherical in shape, at least at its initial point of contact with the camming surface 64 of nut 16, although it could be frusto-conical.

The ring-type compression nut 16 is provided with interior threads 62 for cooperating with the threads 30 on the portion 22. At the inner end of the threads 62, the nut 16 is provided with the frusto-conical camming surface 64 which terminates in an opening 66 having a diameter sufficient to easily receive the outside diameter of the pipe P.

Referring now specifically to FIGS. 3 and 4, the joint 10 of the present invention may be made up as follows. The compression nut 16 is slipped onto the end portion of the pipe P and the end portion of the pipe P is then inserted into the body member 12 by passing it through the collet nose 32, the sealing ring 14, and into the portion 38 of the passageway 18 until it abuts the annular shoulder 28 functioning at this time as an initial position stop. Once the pipe P has been so positioned, the compression nut 16 is threaded onto the threads 30 of the axially extending end portion 22 and its interior inwardly tapered camming surface 64 engages the camming surface 63 on the fingers 36 of the collet nose 32. Further advancement of the compression nut 16 onto the body member 12 causes the camming surface 64 of the nut to cam the fingers 36 about their hinge point, as indicated at 68, which is located in a thin section of the end portion 22 at the inner ends of the slots 34 which extend slightly into the groove 42, the section being thin because the fingers extend from the forward portion of the bottom of the groove 46. The gripping tooth 52, which is not hindered by the flow of gasket material of sealing ring 14 into the space 56 during makeup because of the unique loading of the same by the wall 48, tightly constricts about the pipe P and irregularly deforms the same, as diagrammatically shown in FIG. 2 at 70, so that the pipe P cannot rotate relative to the body member 12. It will be noted that the inner wall of the tooth 52 is substantially perpendicular to the axis of the pipe when the joint is made up. Continued advancement of the nut 16 eventually causes the nut to bottom on the shoulder 28 of the body member 12, as shown at 13 in FIG. 4, thus, controlling the limit of inward movement of fingers 36 and the gripping tooth 52. Of course, the circumferential width of the slots 34 between the fingers 36 can be a predetermined dimension so as to control and limit the movement of the gripping tooth 52 inwardly as the walls of the slots will close up and engage one another, thus, stopping the nut without bottoming of the same. During the constricting of the arcuate fingers 36 of the collet nose 32, the tooth 54 on these fingers is also moving inwardly on an arc and is applying a load on the sealing ring 14 causing the sealing ring to deform and tightly seal around the exterior of the pipe P and in the groove 42 of the body member 12. The groove 42 effectively becomes a variable volume compression chamber during makeup of the joint 10.

It will be appreciated by reference to FIGS. 3 and 4 that the annular shoulder 40 has a taper which is frusto-conical and which has a very shallow angle with respect to the axis of the end portion 22. While the shoulder 40 initially functions as stop to properly position the pipe P in the body member, the shallow angle of the shoulder permits some longitudinal movement of the pipe P inwardly into the body member 12 during constriction of the collet nose 32 as the gripping tooth 52 moves in an arcuate path. Referring to FIG. 4, it will be noted that as the gripping tooth 52 swings downwardly and inwardly, it has a tendency to move the pipe P inwardly to the body member 12 and the shallow angle of the shoulder 40 permits the end of the pipe to be slightly tapered or swaged inwardly, as indicated at 72, to accommodate such movement. In order to obtain this type of action between the pipe P and the body member 20, the shoulder 40 has an angle no greater than 20°, but preferably in the order of 15° and, thus, the shoulder can function to initially stop the end of the pipe P when the pipe is being manually inserted into the body member 12 and functions secondarily to permit some longitudinal movement of the pipe P during make up. By providing longitudinal movement of the pipe P during make up, the gripping tooth 52 will deform the pipe only inwardly and will not scrape longitudinally along the surface of the pipe which could possibly cause damage to the surface of the pipe in localized areas of contact with the tooth 52. The use of such a shallow angle on the shoulder 40, as shown in the collet-type joint 10 of the present invention, may also find utility in any type of joint where there is the necessity for initially positioning the pipe and then during make up of the joint, there is further longitudinal movement of the pipe inwardly because forces are applied to the pipe to grip and/or make a seal with the same. For example, the shallow taper 40 of the body member may be utilized in joints of the type shown in the common assignee's U.S. Pat. No. 3,472,532, issued Oct. 14, 1969 to Leopold et at., or U.S. Pat. No. 3,596,933, issued Aug. 3, 1971 to Luckenbill, or in other type joints having these characteristics.

Referring now to FIGS. 7 and 8, there is disclosed a slight modification to the body member 12 of the joint 10 wherein an O-ring 76 is used instead of a sealing ring which is trapezoidal in shape. In this regard, the groove 42' may have its outwardly facing wall 44' extending in a radial plane, whereas the rearwardly facing wall 48' prior to constriction of the collet nose 32 tapers outwardly from the bottom wall 46'. The O-ring must be of sufficient cross-sectional diameters to engage both the wall 48' and the wall 44' prior to constriction so that when the fingers 36 are constricted, the wall 48' will apply a mechanical load to the O-ring. It will be noted from FIG. 8 wherein the fingers 38 are shown constricted, the wall 48', which is one surface of the rear tooth 54, also extends in substantially radial plane through the axis of the end portion 22.

The terminology used throughout this specification is for the purpose of description and not limitation, the scope of the invention being defined in the appended claims.

What is claimed is:

1. An improvement in a collet-type of joint for connecting an end portion of a smooth wall pipe to fittings or other pipes comprising:

a ring-type compression nut having an opening therethrough of a diameter sufficient to insert the smooth wall pipe and having an interior camming surface, said compression nut also having threads thereon;

a hollow body having a passageway therethrough, an axially extending end portion on said body member and through which a portion of said passageway extends, said end portion of said body member terminating in a nose having an exterior camming surface for cooperating with the camming surface on said nut and said nose having a plurality of longitudinal slots therein which provide constrictable arcuate fingers on the end portion of said body member, said portion of said passageway in said end portion of said body member having an annular shoulder at its inner end facing outwardly and having an interior diameter less than the outside diameter of the pipe and arranged for initial abutting of the end of the pipe and further having an annular groove therein adjacent to said nose and spaced outwardly of said shoulder, said annular groove being defined by an outwardly facing wall, a bottom wall, and a rearwardly facing wall in said nose and into which said slots extend, a first interiorly extending tooth on said nose defined by arcuate tooth segments adjacent the end of the fingers thereof, a second interiorly extending tooth on said nose defined by arcuate tooth segments of the fingers thereof, said second interiorly extending tooth being spaced inwardly from said first interiorly extending tooth to define between said first and second teeth an annular space, and said second tooth having one face defining the rearwardly facing wall of said annular groove, said first tooth having a crest diameter sufficient to receive said pipe prior to constriction of the fingers of said nose and said second tooth having a crest diameter prior to constriction of the fingers of said nose greater than the crest diameter of said first tooth, and threads on the end portion of said body member for cooperating with the threads on said compression nut;

and a sealing ring in said annular groove in the end portion of said body member, said sealing ring being deformed into sealing engagement with said pipe by the one face of said second tooth when the arcuate fingers of said nose are constricted by said compression nut, said first tooth initially engaging and gripping said pipe and any material of said sealing ring flowing outwardly along said pipe being received into said space between said first tooth and said smooth tooth until said second tooth subsequently just engages said pipe and provides a block for further flow of said sealing ring outwardly along said pipe.

2. A joint as claimed in claim 1 in which said sealing ring is substantially complimentary in shape to said annular groove.

3. A joint as claimed in claim 2 in which said groove is substantially trapezoidal in cross section and in which said forwardly facing wall has an angle to the axis of said end portion of said body member which is less than an angle of said rearwardly facing wall to the axis of said end portion of said body member prior to constriction of the fingers of said nose.

4. A joint as claimed in claim 1 in which said sealing ring is an O-ring.

5. A joint as claimed in claim 4 in which said rearwardly facing wall of said annular groove tapers outwardly from said bottom wall at least prior to the fingers of said nose being constricted.

6. A joint as claimed in claim 1 in which said threads on said end portion on said body member are exterior threads which extend from adjacent the slots in said nose rearwardly and in which said threads on said compression nut are interior threads.

7. A joint as claimed in claim 6 in which said camming surface in said nut is frusto-conical and in which said camming surface on said nose is frusto-spherical whereby contact between said nut on said nose is a minimum, thereby reducing torque when said nut is advanced.

8. A joint as claimed in claim 1 in which said annular shoulder in the passageway in said portion of the body member is tapered inwardly and rearwardly at an angle no greater than 20° to a longitudinal axis of said passageway whereby the pipe may have limited longitudinal movement inwardly of the body member when said joint is being made up.

9. A joint as claimed in claim 8 wherein said tapered angle is in the order of 15°.

10. An improvement in a collet-type of joint for connecting an end portion of a smooth wall pipe to fittings or other pipes comprising:

a ring-type compression nut having interior threads, an interior tapered camming surface, and an opening at the end of the camming surface having a diameter sufficient to insert the smooth wall pipe;

a hollow body member having a passageway therethrough, an axially extending end portion on said body member and through which the portion of the passageway extends, said end portion of said body member terminating in a nose having an exterior camming surface for cooperating with the camming surface on said nut and exterior threads extending from said nose portion for cooperating with the threads on said nut, said nose having a first interiorly extending pipe gripping tooth at its end with a crest diameter sufficient to receive the pipe and a second interiorly extending tooth spaced inwardly from said first tooth and having a slightly larger crest diameter than the same, said first tooth and said second tooth defining an annular space therebetween, said second tooth having a rearwardly facing wall, said nose having a plurality of longitudinally extending slots defining arcuate fingers with said slots extending through said second tooth and terminating short of said exterior threads, an annular groove in the portion of the passageway extending through said end portion, said annular groove being defined by the rearwardly facing wall of said second tooth, a bottom wall, and a forwardly facing wall, and said groove being generally trapezoidal in shape in radial section, and said portion of said passageway in said end portion of said body member having an outwardly facing shoulder spaced inwardly of said annular groove, said shoulder having an interior diameter less than the outside diameter of the pipe and arranged for initial abutting of the end of the pipe;

and a sealing ring in said annular groove and having a generally trapezoidal shape in radial cross section complimentary to the shape of said annular groove, said sealing ring being deformed into sealing engagement with said pipe by the rearwardly facing wall of said second tooth when the arcuate fingers of said nose are constricted by said compression nut, said first tooth on said nose initially engaging and gripping said pipe and with any material of said sealing ring flowing outwardly along said pipe being received into said space between said first tooth and said second tooth until said second tooth on said nose subsequently engages said pipe and provides a block for further cold flow of said sealing ring.

11. A joint as claimed in claim 10 in which said outwardly facing shoulder tapers inwardly away from said annular groove at an angle to the axis of the portion of the passageway in said end portion of said body member shallow enough to permit the pipe to have limited longitudinal movement inwardly of the body member tapering or swaging of its end when said first tooth on said nose grips the pipe as the fingers are being constricted.

12. A joint as claimed in claim 11 wherein the shallow angle of said shoulder is in the order of 15°.

* * * * *